S. S. NEWTON,
Assignor to S. S. NEWTON & Co.
Design for Package for Powdered Articles.
No. 9,674. Reissue-Design, April 19, 1881.
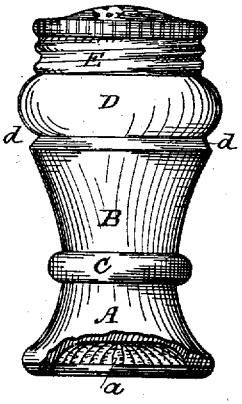
*Witnesses:*
W. B. Masson.
J. S. Barker.
*Inventor.*
S. S. Newton
by Doubleday & Bliss
attys
N. PETERS, PHOTO-LITHOGRAPHER, WASHINGTON, D. C.

UNITED STATES PATENT OFFICE.

STEPHEN S. NEWTON, OF BINGHAMTON, NEW YORK, ASSIGNOR TO S. S. NEWTON & CO., OF SAME PLACE.

DESIGN FOR PACKAGE FOR POWDERED ARTICLES.

SPECIFICATION forming part of Reissued Design No. 9,674, dated April 19, 1881.

Original No. 11,965, dated September 14, 1880. Application for reissue filed March 22, 1881.

*To all whom it may concern:*

Be it known that I, STEPHEN S. NEWTON, a citizen of the United States of America, residing at Binghamton, in the county of Broome and State of New York, have invented certain new and useful Improvements in Design for a Package for Powdered Articles; and I do hereby declare the following is a full, clear, and exact description of the invention, that will enable others skilled in the art to which it appertains to make and use the same, reference being had to the accompanying drawing, and to letters of reference marked thereon, which forms a part of this specification.

In the drawing, which is an elevation of my new design, A represents the base of the vessel, B the lower part of the body, E the cap or cover, and D the upper part of the body, between the cover and the part B.

The base A is of greater external diameter at the bottom than it is at the top, the outer surface being somewhat concave and circular in cross-section. Immediately above the base A there is a laterally-projecting fillet or bead, C.

The body B D extends from the bead or fillet C to the cap E, the lower part, B, being circular in cross-section, and of less external diameter at its junction with fillet C than it is at its upper end.

The upper part, D, of the body is of the form of a ring whose outer surface is curvilinear in vertical section and of the same contour throughout, and having the diameter of the upper side equal to that of the lower.

In order to make a stronger and more pleasing contrast between the cap B and the ring part D, I form in the outer surface of the vessel a recess, *d*, between these parts.

The base is hollow or concave on the under side, and is formed with a series of radial flutings, *a*.

I am aware that vessels have been constructed with bodies in the form of inverted truncated cones, having the diameter of their upper ends much larger than that of the necks or caps of the vessel, and I do not claim such forms or designs.

What I claim is—

A design for package for powdered articles, having a base, A, of less diameter at the top than at the bottom, the fillet C, the body B, of less diameter at the bottom than at the top, the ring D above the body B, and the projecting neck and top E above the ring D, substantially as set forth.

In testimony whereof I affix my signature in presence of two witnesses.

STEPHEN S. NEWTON.

Witnesses:

NERI PINE,

JOHN B. HAGAMAN.